Feb. 18, 1969    R. R. ST. JEAN    3,428,353
APPARATUS FOR TRAPPING AND RETRIEVING
Filed Oct. 19, 1966
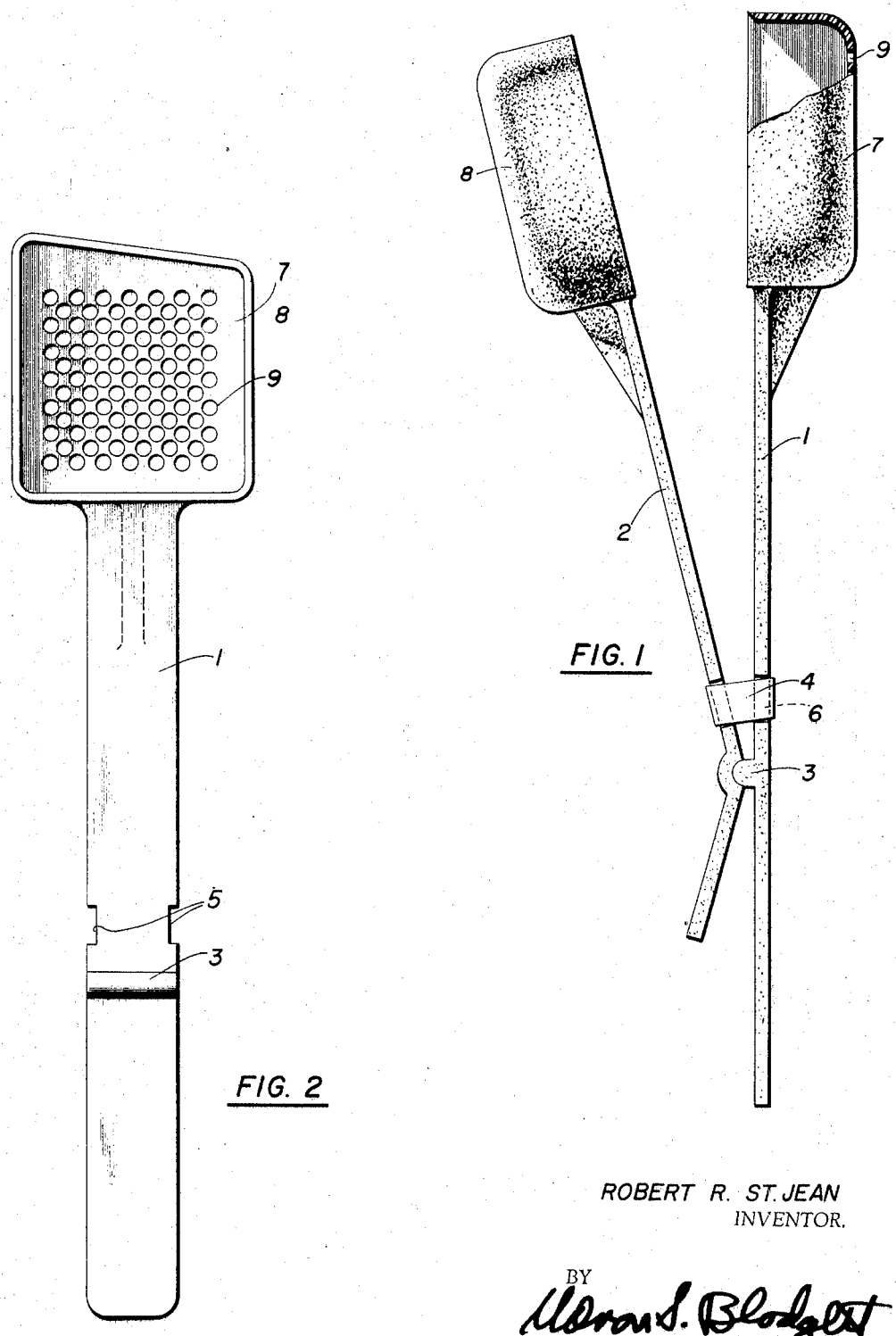
ROBERT R. ST. JEAN
INVENTOR.

United States Patent Office 3,428,353
Patented Feb. 18, 1969

3,428,353
APPARATUS FOR TRAPPING AND
RETRIEVING
Robert R. St. Jean, 48 Bryn Mawr,
Auburn, Mass. 01501
Filed Oct. 19, 1966, Ser. No. 587,879
U.S. Cl. 294—15                        8 Claims
Int. Cl. B65g 7/12

ABSTRACT OF THE DISCLOSURE

The invention relates generally to an apparatus for trapping and retrieving and finds particular utility in retrieving insects and small live creatures without physical damage to the same.

In a particular embodiment of the concept of the invention the apparatus comprises a first straight arm having a first cup at one end thereof and a pivot near the other end, a second arm having a straight portion and another shorter portion at an angle thereto, with a second cup at one end of the straight portion and a recess cooperating with the pivot connecting the straight portion and the shorter portion, and a rubber band holding the handles and cups in a registered relationship.

BACKGROUND OF THE INVENTION

Devices are known for destroying insects on the wing but none of them incorporate the concept of retrieving insects, fish or small animals alive without physical damage so that the surviving creature may be liberated. Such prior art vermin and insect destroying devices are disclosed in U.S. Patents 1,099,342; 1,660,011 and 2,434,364, the disclosures of which are incorporated herein.

Judging by the prior art there is a need for a device for catching bees in an automobile, small fish from an aquarium and small animals for examination followed by releasing the unharmed creatures in another environment.

DECRIPTION OF THE INVENTION

It is, therefore, an object of the present invention to provide a device for capturing small living creatures while the creatures are in motion without harming or destroying them.

A particular object of the present invention is to provide a device for trapping bees or other insects in a closed environment and for releasing them out of doors.

Another particular object of the invention is to provide a device for catching small fish in an aquarium and for transferring and releasing them unharmed in a more secure aquarium.

Still another particular object of the invention is to provide a device for retrieving small objects such as golf balls, coins and keys from inaccessible places.

In fulfilling another particular object of the invention a device is provided for trapping small animals while on the run to be examined and released unharmed.

Still further objects and the broad scope of the invention will become obvious from a reading of the specification and claims and by reference to preferred structural forms as illustrated by the accompanying drawing in which:

FIGURE 1 is a side view, partly in section, showing the device in operation; and FIGURE 2 is a plan view, partly in section, of the movable member showing another preferred embodiment.

Referring first to FIGURE 1, the general features of the device are best shown as comprising a normally stationary arm 1 and a movable arm 2 pivotally mounted on the stationary arm by means of a cylindrical fulcrum 3 or other suitable form of pivot, and urged into a closed position by a rubber band 4. The fulcrum 3 may take a number of forms. The fulcrum may be made integral with the stationary arm 1 or movable arm 2, it may be a separate unattached piece of roll stock held in position by the rubber band, or it may be cemented or fused to one of the arms.

The arms may be recessed at 6 as shown in FIGURE 1, or at 5 as shown in FIGURE 2, to maintain the rubber band in position.

The stationary and movable arms carry complementary cup-shaped members 7 and 8 respectively at their free ends. In a preferred embodiment, the adjacent open sides of these members are formed with peripheral edges which come into close registration with each other when the device is closed. In another preferred embodiment of the device at least one cup-shaped member has a foraminous surface such as 9 of FIGURE 2, permitting the drainage of fluid media.

In the construction of the device a preferred embodiment contemplated incorporates the use of clear plastic material particularly in the cup-shaped members so that the material retrieved may be observed without the possibility of loss of the material. Suitable materials of construction comprise synthetic and natural polymers such as polyethylene, polypropylene, polymethyl methacrylate and the various nylons, but the invention is not limited to these materials of construction.

In a preferred method for operating the device, the stationary arm 1 is held by the fingers of one hand and the short end portion of movable arm 2 is depressed by the thumb against the action of the rubber band 4. An insect, small animal or fish is pursued until the creature is in proximate relationship with the cup-like members. The short end portion of movable arm 2 is then released and the cup-like members come together as shown by the dotted lines of FIGURE 1, and the creature is captured.

In the preferred embodiment shown in FIGURE 2, the cup-like member is shown having a leading surface disposed at a particular angle. This angular surface is particularly advantageous for catching bees or other stinging insects which have intruded into the interior of an automobile. The bee is trapped at the slanting surface of the windshield and is released to the outside air with no harm to the bee or the occupants of the automobile.

Another particular embodiment of the device is contemplated for retrieving lost articles. In this embodiment the stationary arm is extended or a stick is attached thereto. A string is looped about the lower portion of the arms when the movable portion is in its open position and the string is stretched parallel to the extended stationary arm. Items such as a lost golf ball may be retrieved by catching the ball in the cup-like member of the stationary arm and pulling the string to remove the loop thereby releasing the movable arm 2.

The device of the present invention finds particular utility in removing insects from houses, trailers, tents, stores, schools and offices. Bees, wasps, spiders, scorpions, moths, crickets, beetles and other insects are no longer a problem.

The device is useful at lakes and the seashore for catching water specimens, crawfish, crabs, small fish, etc. A fisherman may use the device to easily remove a shiner from a pail of water. It is useful to aquarium fish fanciers to easily catch newly hatched guppies, goldfish or any aquarium fish without injury. Apiarists find the device useful to safely catch bees for close examination.

As can be seen from an examination of the invention, the device is readily capable of carrying out the desired objects and has extensive utility.

It is obvious that minor changes may be made in the form and construction of the invention without departing from the material spirit thereof. It is not, however, desired to confine the invention to the exact form herein shown and described, but it is desired to include all such as properly come within the scope claimed.

I claim:
1. An apparatus for retrieving comprising:
 (a) a straight stationary arm having a first cup-like member at one end and means for pivoting near the other end;
 (b) a movable arm having a first straight portion and a second shorter straight portion disposed at an angle thereto, said first straight portion having a second cup-like member at one end, and means cooperating with said means for pivotally connecting said first straight portion and said second shorter portion; the cups being formed of transparent material and formed with a plurality of apertures; and
 (c) means for resiliently holding and returning said arms and cup-like members into registry.

2. The apparatus of claim 1, wherein said means for pivoting comprises a cylinder and said arms have recesses cooperating with said cylinder.

3. The apparatus of claim 2, wherein said cylinder is cemented to one of said recesses.

4. The apparatus of claim 1, wherein said means for pivoting comprises a half cylinder surface integral with one of said arms.

5. The apparatus of claim 1, wherein said means for resiliently holding and returning is a rubber band.

6. The apparatus of claim 5, further comprising recesses in said arms whereby said rubber band is held in position.

7. The apparatus of claim 1, said cup-like members having a forward margin provided with a straight edge inclined at an acute angle to the length of said stationary arm.

8. The apparatus of claim 7, said cup-like members having peripheral edges facilitating close registration when the apparatus is closed.

References Cited
UNITED STATES PATENTS

| | | | |
|---|---|---|---|
| 206,482 | 7/1878 | Poole | 294—50.8 |
| 1,895,214 | 1/1933 | Stork | 294—50.8 |

FOREIGN PATENTS

| | | |
|---|---|---|
| 24,055 | 6/1902 | Great Britain. |

ANDRES H. NIELSEN, *Primary Examiner.*